US012561085B2

(12) United States Patent
Lee et al.

(10) Patent No.: US 12,561,085 B2
(45) Date of Patent: Feb. 24, 2026

(54) HARDWARE ACCELERATOR

(71) Applicants:Lemon Inc., Grand Cayman (KY);
Douyin Vision Co., Ltd., Beijing (CN)

(72) Inventors: Chul Lee, Los Angeles, CA (US); Hui Zhang, Los Angeles, CA (US); Bo Li, Beijing (CN); Shan Xiao, Beijing (CN); Ping Zhou, Los Angeles, CA (US); Fei Liu, Los Angeles, CA (US)

( * ) Notice: Subject to any disclaimer, the term of this patent is extended or adjusted under 35 U.S.C. 154(b) by 1 day.

(21) Appl. No.: 18/462,108

(22) Filed: Sep. 6, 2023

(65) Prior Publication Data

US 2023/0418512 A1 Dec. 28, 2023

(51) Int. Cl.
*G06F 3/06* (2006.01)

(52) U.S. Cl.
CPC .......... *G06F 3/0655* (2013.01); *G06F 3/0613* (2013.01); *G06F 3/067* (2013.01)

<u>100</u>

(58) Field of Classification Search
CPC ...... G06F 3/0655; G06F 3/0613; G06F 3/067; G06F 3/061; G06F 3/0658; G06F 3/0673
USPC .......................................................... 711/154
See application file for complete search history.

(56) References Cited

U.S. PATENT DOCUMENTS

| | | | | |
|---|---|---|---|---|
| 2007/0078800 | A1* | 4/2007 | Love .................... | G06F 16/1734 |
| 2022/0188028 | A1* | 6/2022 | Mesnier ................ | G06F 3/0659 |
| 2022/0326887 | A1* | 10/2022 | Caraccio ............... | G06F 3/0659 |
| 2023/0098879 | A1* | 3/2023 | Ou ....................... | G06F 13/4234 |
| | | | | 711/105 |
| 2023/0342214 | A1* | 10/2023 | Willis .................... | G06F 9/505 |
| 2023/0350854 | A1* | 11/2023 | Hayashi ................ | G06F 16/188 |
| 2024/0118830 | A1* | 4/2024 | Murphy ................. | G06F 3/067 |

* cited by examiner

*Primary Examiner* — Hashem Farrokh
(74) *Attorney, Agent, or Firm* — Fish & Richardson P.C.

(57) ABSTRACT
Solutions are presented to reduce a number of data transfers between a host system and a storage device by utilizing a file path to identify data to be processed, thus enabling an offloading engine to independently locate the file and read corresponding data.

11 Claims, 3 Drawing Sheets

100

200

170

300

HARDWARE ACCELERATOR

TECHNICAL FIELD

The embodiments described herein pertain generally to a workload management in a storage environment.

BACKGROUND

Non-volatile storage, e.g., block-level storage, is used to store data on storage area networks, e.g., servers, in cloud-based storage environments, data centers, etc. Cloud-based storage or storage devices are commonly offered by cloud service providers (CSPs). In such environments, data acceleration may be implemented by offloading operations from a host controller to the non-volatile storage system hardware, e.g., to controllers having hardware, software, and/or firmware, that are in communication with the non-volatile storage on the server or connected via a peripheral component interconnect express (PCle) card.

SUMMARY

In one example embodiment, a system includes a host device, a hardware accelerator, and a corresponding filesystem reader. The hardware accelerator includes a non-volatile storage to store on-disk data. The filesystem reader is to maintain a representation of filesystem information corresponding to the non-volatile storage and read the retrieved data to the host device.

In accordance with at least one other example embodiment, a non-volatile computer-readable medium has executable components that function as a hardware accelerator. The components include an accelerator engine to execute acceleration operations, and a filesystem reader that is to scan filesystem metadata of a non-volatile storage device, and render an in-memory representation of the filesystem on an internal memory of the non-volatile storage device.

BRIEF DESCRIPTION OF THE DRAWINGS

In the detailed description that follows, embodiments of a hardware accelerator corresponding to a system having a host device and non-volatile storage are described as illustrations only since various changes and modifications will become apparent to those skilled in the art from the following detailed description. The use of the same reference numbers in different figures indicates similar or identical items.

DETAILED DESCRIPTION

Figure 1:
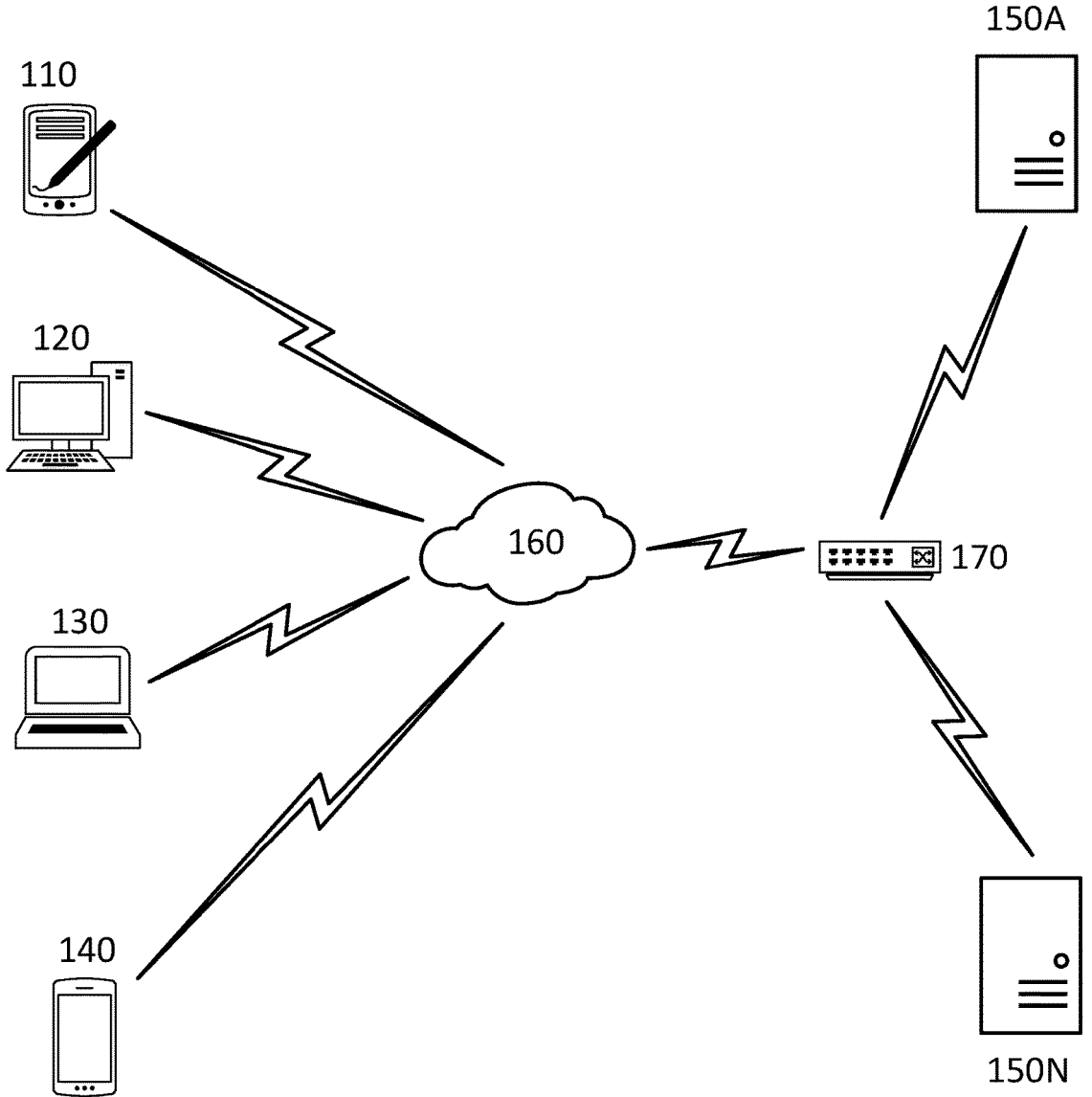
FIG. 1 shows a non-limiting example of a cloud-based storage system in which a hardware accelerator is implemented, arranged in accordance with at least some embodiments described and recited herein.

In the following detailed description, reference is made to the accompanying drawings, which form a part of the description. In the drawings, similar symbols typically identify similar components, unless context dictates otherwise. Furthermore, unless otherwise noted, the description of a successive drawing may reference features from any previous drawing to provide clearer context and a substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described and recited herein, as well as illustrated in the drawings, may be arranged, substituted, combined, separated, and designed in a wide variety of different configurations, all of which are explicitly contemplated herein.

Additionally, portions of the present disclosure may be described herein in terms of functional block components and various processing steps. It should be appreciated that such functional blocks may be realized by any number of firmware, software, and/or hardware components configured to perform the specified functions.

FIG. 1 shows a non-limiting example of a cloud-based storage system in which a hardware accelerator is implemented, arranged in accordance with at least some embodiments described and recited herein.

System 100 may be implemented in accordance with at least some embodiments described and recited herein. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or any combination thereof.

System 100 may include terminal devices 110, 120, 130, and 140; network 160; a host controller 170, e.g., host device; and one or more servers 150A . . . 150N. In accordance with the non-limiting example embodiments described and recited herein, FIG. 1 shows non-limiting quantities of the terminal devices, network, host device, and servers. That is, the number of terminal devices, networks, the host device, and/or servers described herein are provided for descriptive purposes only and are not intended to be limiting.

In accordance with at least some example embodiments, terminal devices 110, 120, 130, and 140 may be one or more of electronic devices including but not limited to table/e-reader 110, desktop computer 120, laptop computer 130, or smartphone 140.

In accordance with at least some non-limiting example embodiments described and recited herein, network 160 is designed programmed, or otherwise configured to provide a communications link between the terminal devices 110, 120, 130, 140 and one or more of servers 150. Network 160 may include, e.g., the Internet, a local area network (LAN), a wide area network (WAN), a local interconnect network (LIN), a cloud network, etc. Further, a communication link provided by or to network 160 may be implemented by any one or more of a wired communications link, a wireless communications link, an optical fiber cable, etc.

In accordance with at least some non-limiting example embodiments described and recited herein, host controller 170 is designed programmed, or otherwise configured to link servers 150A . . . 150N together, e.g., in a data center or to link other host controllers, e.g., in other data centers.

Further, host controller 170 is designed programmed, or otherwise configured to send and/or receive applications, services, data, etc., to one or more of connected terminal devices 110, 120, 130, 140.

In accordance with at least some non-limiting example embodiments described and recited herein, One or more servers 150A . . . 150N is designed programmed, or otherwise configured to provide various services, e.g., cloud storage and/or computing services to end users that are using one or more of terminal devices 110, 120, 130, and 140. Servers 150A . . . 150N may be implemented as a data center that includes a distributed server cluster including one or more of servers 150A . . . 150N. In some embodiments, one or more data centers may be in communication with each other over network 160. One or more of servers 150A . . . 150N may also include a controller to control hardware and/or storing software and firmware and providing the functionalities of one or more of servers 150A . . . 150N.

Hereafter, unless context requires otherwise, reference will be made to "server 150," which is to convey implementation of one or more of servers 150A . . . 150N.

In some embodiments, server 150 may correspond physically or communicatively with one or more storage devices, e.g., non-volatile memory (NVM) solid state drives (SSDs), e.g., flash memory, using various communication interfaces that allow for robust data storage and/or retrieval on/from one or more such storage devices. In some embodiments, a communication interface between host device 170 and sever 150 may be the NVMe or non-volatile memory host controller interface protocol. NVMe protocol was developed in response to the need for a faster interface between computer processing units (CPUs) and SSDs. NVMe may be a logical device interface for accessing the SSDs connected to the server controller, for example, via a Peripheral Component Interconnect Express (PCIe) bus that provides a leaner interface for accessing the SSDs.

In accordance with at least some non-limiting example embodiments described and recited herein, a controller on host device 170 may transmit, e.g., a NVMe disk access command, such as for example read/write commands, to a controller of server 150 using command queues. Controller administration and configuration may be handled via admin queues while input/output (I/O) queues may be used to handle data management. Each NVMe command queue may include one or more submission queues and one completion queue. As such, commands may be provided from a controller of host device 170 to a controller of server 150 via the submission queues and responses are returned to the controller on the host device via the completion queue.

For example, a controller on host device 170 may create a read or write command to execute along with the hardware offloading functionality/operation in the appropriate submission queue and then writes a tail doorbell register associated with that queue signaling to a controller of server 150, e.g., connected to the SSD, that a submission entry is ready to be executed. A controller on server 150 may fetch the read or write command and the hardware offloading operation by using, for example, direct memory access (DMA) if the command resides in host device memory or directly if it resides in controller memory, and executes the read or write and hardware offloading operation command. Upon completion of the read or write and hardware offloading operation command, the controller on server 150 may write a completion entry to the associated completion queue. The controller on host device 170 may pull and process the completion queue entry and write a doorbell head register for the completion queue indicating that the completion entry has been processed. The memory for the queues and data to transfer to and from the controller on the server may reside in the controller of the host device's memory space; however, the NVMe specification allows for the memory of queues and data blocks to be allocated in the controller's memory space using a Controller Memory Buffer (CMB). The NVMe standard has vendor-specific register and command space that can be used to configure an NVMe storage device with customized configuration and commands.

An end user may use one or more of terminal devices 110, 120, 130, or 140 to interact with server 150 via network 160. In some embodiments, various applications, such as social media applications, social networking applications, shopping applications, gaming applications, etc., may be installed on terminal devices 110, 120, 130, or 140. In some embodiments, the end user may request big data analytics or data mining on data on the storage devices connected to server 150 for supporting learning models or the like.

In accordance with the non-limiting example embodiments described and recited herein, software applications or services provided by cloud service providers may be performed by host controller 170, server 150, and/or terminal devices 110, 120, 130, and/or 140 (hereafter referred to, in the alternatively, as user devices). Accordingly, the apparatus for the software applications and/or services may be arranged in the host controller 170, the server 150, and/or in terminal devices 110, 120, 130, and 140.

Further, In accordance with the non-limiting example embodiments described and recited herein, when a service is not performed remotely, system 100 might not include network 160, but include terminal device 110, 120, 130, and 140, host controller 170, and/or server 150.

Further, terminal devices 110, 120, 130, and 140; host controller 170; and/or server 150 may each include one or more processors, firmware, and a storage device storing one or more programs; an Ethernet connector, a wireless fidelity receptor, etc. Further still, the one or more programs, when executed by the one or more processors, may cause the one or more processors to perform the methods described and/or recited herein. Also, a non-volatile computer readable medium may be provided according to the embodiments described herein to, at least, store computer programs that are used to, when being executed by a processor, perform the method(s) described in any embodiments described herein.

Figure 2:
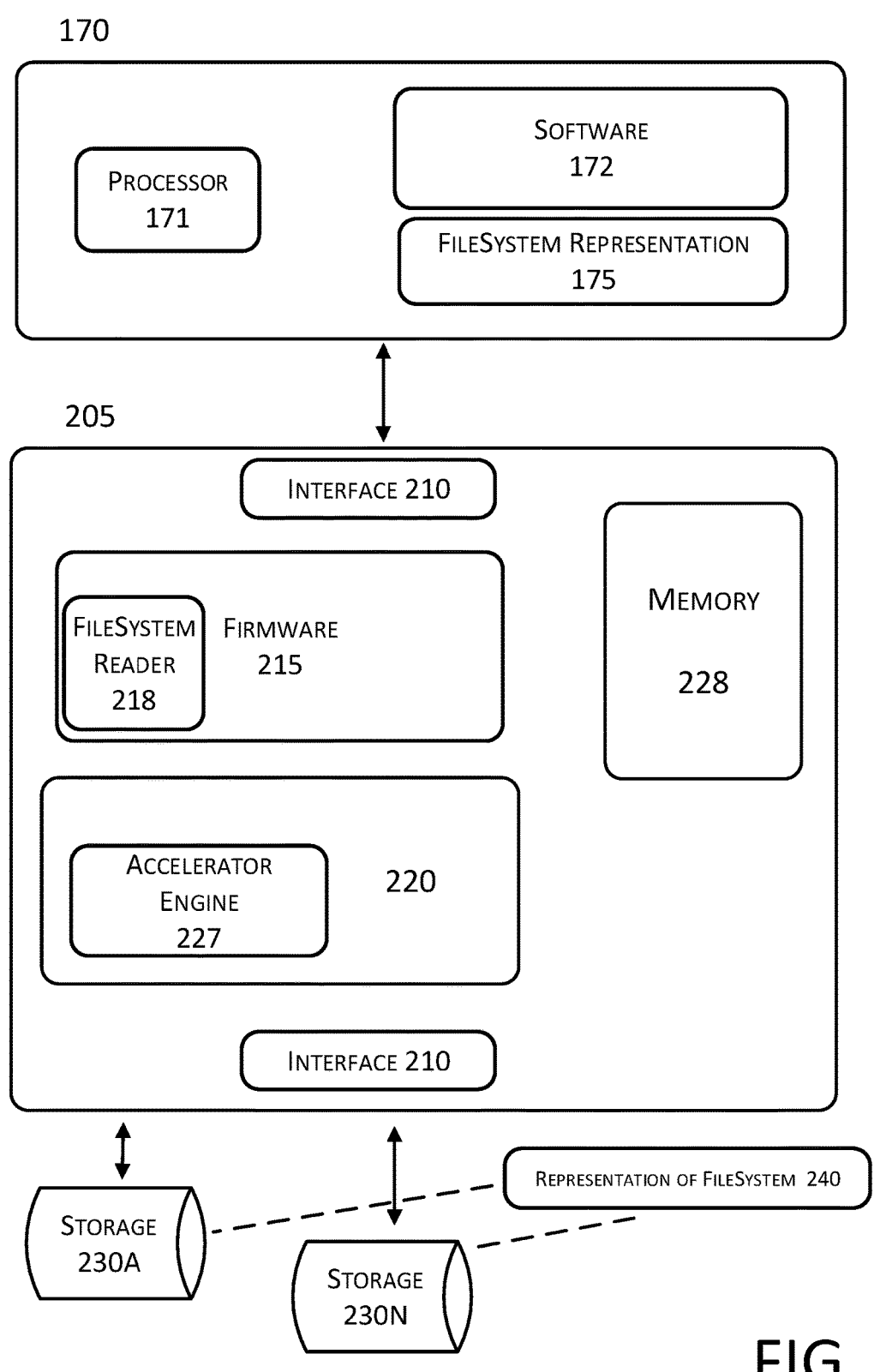
FIG. 2 is a schematic view of an example working node for a non-volatile storage device in a data center architecture, in accordance with at least some embodiments described and recited herein.

FIG. 2 is a schematic view of an example working node for a non-volatile storage device in a data center architecture, in accordance with at least some embodiments described and recited herein.

Data center architecture 200 may be arranged in accordance with at least some embodiments described and recited herein. Although illustrated as discrete components, various components may be divided into additional components, combined into fewer components, or eliminated altogether while being contemplated within the scope of the disclosed subject matter. Each function and/or operation of the components may be implemented, individually and/or collectively, by a wide range of hardware, software, firmware, or any combination thereof.

Data center architecture 200 includes, at least, host device 170, hardware-offloading engine 205, and one or more storage devices 230A-230N. In accordance with at least one non-limiting example embodiment described and recited herein, data center architecture 200 may include one or more of host device 170 and/or one or more of hardware-offloading engine 205, which may correspond physically or communicatively with one or more of server 150, as described with reference to FIG. 1. The embodiments described herein are not limited to the number of host device 170, hardware-offloading engine 205, and/or storage devices 230A . . . 230N. Therefore, unless context otherwise requires, reference will be made to host device 170, hardware-offloading engine 205, and/or storage devices 230 in the singular, without limitation on the quantity thereof in accordance with the non-limiting example embodiments described and recited herein.

Host device 170, in accordance with non-limiting example embodiments described and recited herein, may be implemented as a controller, a central processing unit (CPU), or software on server 150 or on a central node in data center architecture 200; and may be communicatively connected to one or more of server 150 and/or one or more of hardware-offloading engine 205. In some embodiments, host device 170 may include processor 171 and one or more of software application 172 to operate, manipulate, read, write, delete, store, or otherwise access data and/or corresponding block addresses, on one or more of storage devices 230, via off-loading engine 205. When host device 170 writes data to storage 230, host device 170 may send the data to hardware-offloading engine 205.

In accordance with non-limiting example embodiments described and recited herein, host device 170 is designed programmed, or otherwise configured to support big data analytics systems and/or, in combination, with business intelligence solutions that collect, process, scrub, and analyze big data, e.g., data mining, predictive analytics, real-time analytics, or the like. Therefore, host device 170 may include one or more software applications 172 to support a big data analytics system and may include one or more of application programming interface(s) (APIs), software development kit(s) (SDKs), one or more device drivers, one or more runtime library, one or more software plug-in, management tool, etc.

Hardware-offloading engine 205, in accordance with non-limiting example embodiments described and recited herein, may be implemented as software or as a card that is insertable into, e.g., server 150. A non-limiting example of hardware-offloading engine 205 is an add-in card, such as a PCIe card, to be communicatively connected directly or remotely with storage device 230 and/or host device 170. Hardware-offloading engine 205 may include one or more of interface 210, processor, CPU, or controllers, firmware 215, hardware accelerator module 220, static random-access memory (SRAM), dynamic random-access memory (DRAM), or the like.

Interface 210 is designed programmed, or otherwise configured to provide communications with host device 170 as, e.g., an interface for motherboard components to provide point-to-point connections. In some embodiments, the interface 210 may be a PCIe slot interface, e.g., with 16 lanes. In some embodiments, interface 210 may also be provided to communicate with the storage devices 230A . . . 230N and may be a PCIe interface, e.g., with 4 lanes.

In some embodiments, hardware accelerator 220 is designed, programmed, or otherwise configured to perform hardware offloading functions/operations. Hardware accelerator 220 may include and/or be implemented as software, firmware, application specific integrated circuits (ASICs), and/or field programmable gate arrays (FPGAs). Hardware accelerator 220 may be connected to host device 170 via interface bus 210, via device drivers that are specific to a particular software and hardware platform utilized for acceleration, e.g., for big data analytics.

Hardware accelerator 220 is designed, programmed, or otherwise configured to provide NVMe controller functionalities to host device 170 and/or act as a host to storage devices 230. In some embodiments, hardware accelerator 220 may include hardware level functionalities including, but not limited to, decompression, filtering, projection, aggregation, comparing, adding, subtraction, division, multiplication, shifting, inclusive or (OR), exclusive or (XOR), data mining, analysis, or the like. In some embodiments, the hardware accelerator modules 220 may be linked dynamically to form a pipe-line given query execution framework, e.g., ASICs or FPGAs in series, parallel, or the like, and also may be re-programmable when end users want different execution(s) to be offloaded.

More particularly, hardware accelerator 220 may be designed, programmed, or otherwise configured to comprehend on-disk file and/or filesystem information that is stored in storage devices 230, thus ensuring consistency with in-memory file/filesystem information on host device 170.

Accordingly, in the non-limiting example embodiments described and recited herein, hardware accelerator 220 includes, at least, filesystem reader 225 and accelerator engine 227.

Filesystem reader 225 is designed, programmed, or otherwise configured to maintain an in-memory representation of file/filesystem information in memory 228 that mirrors or is otherwise substantially similar to data on host device 170, thus, filesystem reader 225 facilitates a reduction in a number of data transfers.

Without filesystem reader 225, hardware accelerator 220 would only know low-level block address-based I/). That is, if not filesystem-aware, software application 172 on host device 170 translates file information into block information for a hardware accelerator to access desired data on storage devices 230. Further, without filesystem 225 and therefore not being filesystem aware, a hardware accelerator would be able to access storage devices 230 only by using block I/O by loading file data into a host-side memory and executing hardware offloading functions, as described above, which requires transferring data back to the hardware accelerator memory and returning the executed output to the host memory. The requirement of multiple data copies significantly impacts performance due to increased latency. Other implementations of hardware accelerators that lack filesystem awareness would require software application 172 on host device 170 to inform the hardware accelerator of a file-to-block translation.

Thus, in accordance with the example embodiments described and recited herein, instead of reading data into memory of host device 170, host software application 172 is able to utilize a file path to identify data to be processed, enabling hardware accelerator 220 to independently locate a file and read data. Rather, software application 172 on host device 170 does not need to translate file data into a set of block addresses, but rather filesystem reader 225 is designed, programmed, or otherwise configured to receive a file path from software application 172. Hardware accelerator 220 then parses block addresses and reads them directly.

Firmware 215 may be implemented as on-disk or down-loadable software on hardware-offloading engine 205 to provide low-level control for device specific hardware, e.g., on hardware-offloading engine 205. In some embodiments, firmware 215 is designed programmed, or otherwise configured to manage multiple storage devices 230 communicatively connected thereto and/or provide virtual NVMe storage to host device 170.

Therefore, hardware accelerator 220 may be viewed as an extension of firmware 215 to comprehend an underlying filesystem representation. Filesystem reader 225 locates block addresses related to a file based on a file path received from software application 172 on host device 170. Memory 228 corresponding to hardware accelerator 220 may or may not store an in-memory representation of a file and/or filesystem.

Accelerator engine 227 is designed, programmed, or otherwise configured to perform a scan operation to synchronize in-memory data between host device 170 and memory 228, to facilitate consistency therebetween since an in-memory representation may become stale when architecture 200 is being used and written. Accelerator engine 227, upon performing the scan operation, identifies modifications and updates the in-memory representation 175 for host device 170. The scan operation is initiated by software application 172 on host device 170. That is, further, when accelerator engine 227 receives a scan operation instruction from software application 172 on host device 170, filesystem metadata on storage devices 230 is scanned, and an in-memory representation of the file system on an internal memory of storage devices 230 is rendered. Thus, accelerator engine performs host-side functions utilizing the in-memory representations of the filesystem on memory 228.

Accordingly, as depicted in FIG. 2, the non-limiting example embodiment of hardware accelerator 220 executes in relation to one or more storage devices 220, has internal memory 228, and filesystem reader 225 is an extension of firmware 215. When a command with a file path is received by hardware accelerator 220 from software application 172 on host device 170, hardware accelerator looks up the file path, locates the sought file data, reads blocks pertaining to the file data in memory 228, executes an acceleration operation, and transfers output results to host device 170.

Thus, the non-limiting example embodiment of hardware accelerator 220 is designed, programmed, or otherwise configured to accelerate hardware performance for a host device relative to a non-volatile storage device by storing on-disk data on the non-volatile storage device; maintaining a representation of filesystem information corresponding to the non-volatile storage device on an offloading engine that is intermediate to the host device and the non-volatile storage device; retrieving data, by the offloading engine, requested by a host device; reading, by the offloading engine, the retrieved data to the host device; and executing, by the offloading engine, host-side operations based on the maintained representation of filesystem information. Further, the offloading engine may read the retrieved data to the host device by receiving a file path from the host device, locating file data on the non-volatile storage for the host device corresponding to the received file path, and reading blocks corresponding to the located file data into an internal memory of the offloading engine. Further still, it is understood that the non-limiting embodiments of the offloading engine may include any one of a FPGA, ASIC, or firmware. And, as set forth above, the offloading engine is synchronized periodically with a memory of the host device; and updating the representation of the filesystem stored in the internal memory of the offloading engine according to the memory of the host device.

Figure 3:
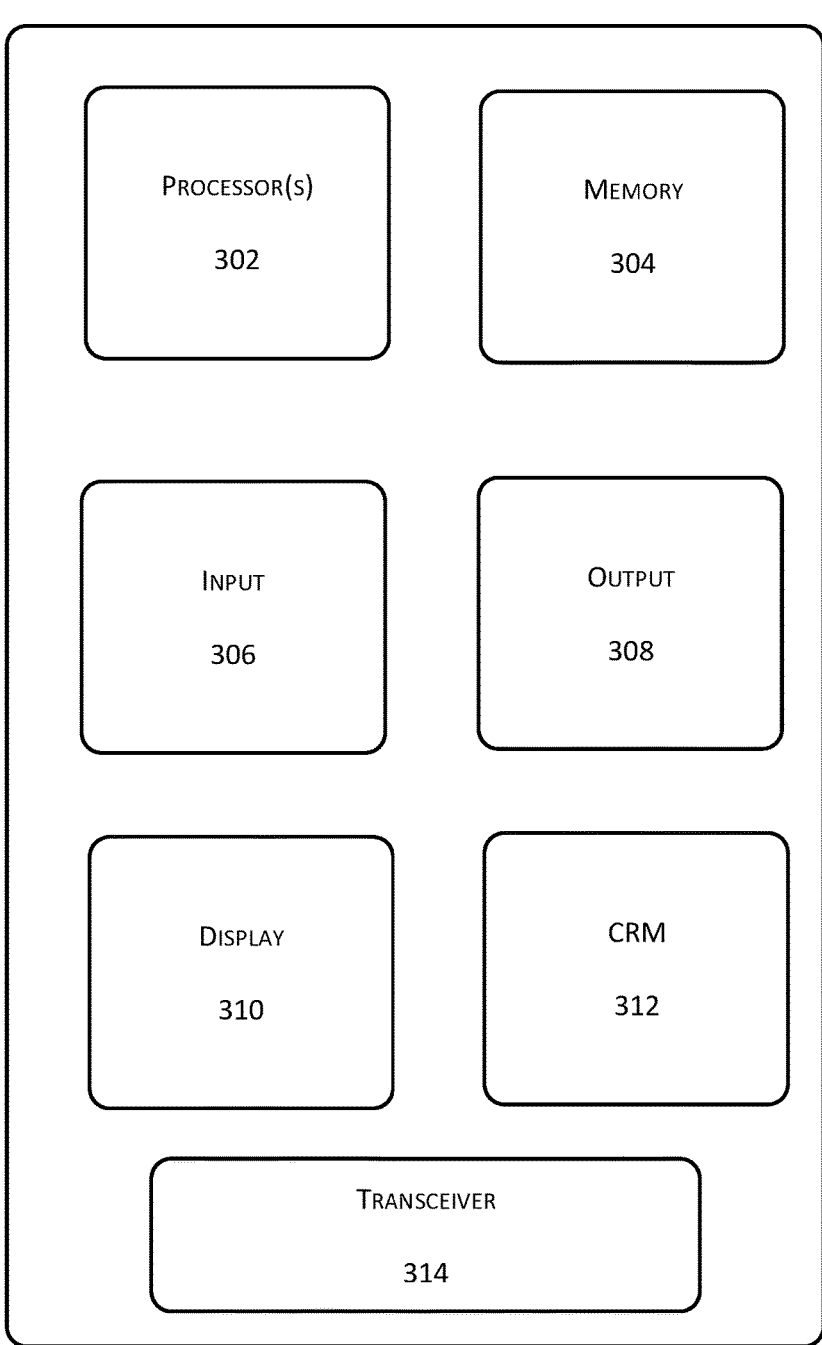
FIG. 3 shows an illustrative computing embodiment, in which hardware accelerator 220 may be implemented as executable components or modules stored on a non-volatile computer-readable medium.

FIG. 3 shows an illustrative computing embodiment, in which hardware accelerator 220 may be implemented as executable components or modules stored on a non-volatile computer-readable medium. The computer-readable modules may, for example, be executed by a processor of a device, as referenced herein, having a network element and/or any other device corresponding thereto, particularly as applicable to the applications and/or programs described above corresponding to architecture 200.

In a very basic configuration, a computing device 300 may typically include, at least, one or more processors 302, a memory 304, one or more input components or modules 306, one or more output components or modules 308, a display component or module 310, a computer-readable medium 312, and a transceiver 314.

Processor 302 refers to, e.g., a microprocessor, a microcontroller, a digital signal processor, or any combination thereof.

Memory 304 refers to, e.g., a volatile memory, non-volatile memory, or any combination thereof. Memory 304 stores therein an operating system, one or more applications corresponding to offloading engine 205 and/or program data therefore. That is, memory 304 stores executable instructions to implement any of the functions or operations described above and, therefore, memory 304 may be regarded as a computer-readable medium.

Input component or module 306 refers to a built-in or communicatively coupled keyboard, touch screen, or telecommunication device. Further, input component or module 306, if not built-in to computing device 300, may be communicatively coupled thereto via short-range communication protocols including, but not limitation, radio frequency or Bluetooth®.

Output component or module 308 refers to a component or module, built-in or removable from computing device 300 that is configured to output commands and data to an external device.

Display component or module 310 refers to, e.g., a solid state display that may have touch input capabilities. That is, display component or module 310 may include capabilities that may be shared with or replace those of input component or module 306.

Computer-readable medium 312 refers to a separable machine-readable medium that is configured to store one or more components or modules described above. That is, computer-readable medium 312, which may be received into or otherwise connected to a drive component or module of computing device 300, may store executable components or modules to function or operate as described above.

Transceiver 314 refers to a network communication link for computing device 300, configured as a wired network or direct-wired connection. Alternatively, transceiver 314 is configured as a wireless connection, e.g., radio frequency (RF), infrared, Bluetooth®, and other wireless protocols.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

Aspects

Aspect 1. A system, comprising:

a host device; and a hardware accelerator, comprising:

a non-volatile storage to store on-disk data, a filesystem reader to:

maintain a representation of filesystem information corresponding to the non-volatile storage device, and read the retrieved data to the host device, and an accelerator engine to execute host-side acceleration operations, on the hardware accelerator, based on the maintained representation of filesystem information.

Aspect 2. The system of Aspect 1, wherein the filesystem reader is to read the retrieved data to the host device by:
receiving a file path from the host device,
locating file data on the non-volatile storage for the host device corresponding to the received file path,
reading blocks corresponding to the located file data into an internal memory of the hardware accelerator, and
executing an acceleration operation.

Aspect 3. The system of either Aspect 1 or Aspect 2, wherein the hardware accelerator engine is configured to:
receive a scan operation from the host device;
scan filesystem metadata from the non-volatile storage; and
render a representation of the filesystem on an internal memory of the non-volatile storage.

Aspect 4. The system of any of Aspects 1 to 3, wherein the hardware accelerator includes any one of field programmable gate arrays (FPGA), application specific integrated circuits (ASIC), or firmware.

Aspect 5. The system of any of Aspects 1 to 4, wherein the hardware accelerator further comprises an internal memory to store the representation of the filesystem.

Aspect 6. The system of Aspect 5, wherein the internal memory of the hardware accelerator memory is periodically synchronized with a memory of the host device, and wherein further the representation of the filesystem stored in the internal memory of the hardware accelerator memory is updated the according to the memory of the host device.

Aspect 7. The system of any of Aspects 1 to 6, wherein the system is implemented at a data center.

Aspect 8. A hardware accelerator having executable components thereon, the components comprising:
a filesystem reader to:
scan filesystem metadata of a non-volatile storage device, and
render an in-memory representation of the filesystem on an internal memory of the non-volatile storage device;
an accelerator engine to execute acceleration operations based on the in-memory representation of the filesystem.

Aspect 9. The hardware accelerator of Aspect 8, wherein the hardware accelerator further comprises a processor that includes any one of field programmable gate arrays (FPGA), application specific integrated circuits (ASIC), or firmware.

Aspect 10. The hardware accelerator of either Aspect 8 or Aspect 9, wherein filesystem reader is to scan the filesystem metadata of the non-volatile storage device in response to a command from a host device.

Aspect 11. The hardware accelerator of any of Aspects 8-10, wherein, in response to the command from the host device, the filesystem reader is to further:
synchronize the in-memory representation of the filesystem on the internal memory of the non-volatile storage device and an in-memory representation of the filesystem on the internal memory of the host device, and
update the in-memory representation of the filesystem on the internal memory of the non-volatile storage device.

Aspect 12. A method of accelerating hardware performance for a host device relative to a non-volatile storage device, the method comprising:
storing on-disk data on the non-volatile storage device;
maintaining a representation of filesystem information corresponding to the non-volatile storage device on an offloading engine that is intermediate to the host device and the non-volatile storage device;

retrieving data, by the offloading engine, requested by a host device;
reading, by the offloading engine, the retrieved data to the host device; and
executing, by the offloading engine, host-side operations based on the maintained representation of filesystem information.

Aspect 13. The method of Aspect 12, wherein the offloading engine reads the retrieved data to the host device by:
receiving a file path from the host device,
locating file data on the non-volatile storage for the host device corresponding to the received file path, and
reading blocks corresponding to the located file data into an internal memory of the offloading engine.

Aspect 14. The method of Aspect 12, wherein the offloading engine includes any one of field programmable gate arrays (FPGA), application specific integrated circuits (ASIC), or firmware.

Aspect 15. The method of Aspect 13, further comprising:
periodically synchronizing the offloading engine with a memory of the host device; and
updating the representation of the filesystem stored in the internal memory of the offloading engine according to the memory of the host device.

The invention claimed is:

1. A system, comprising:
a host device; and
a hardware accelerator, comprising:
a non-volatile storage configured to store on-disk data,
a filesystem reader configured to:
maintain a representation of filesystem information corresponding to the non-volatile storage,
retrieve data requested by the host device, and
read retrieved data to the host device, and
an accelerator engine configured to:
synchronize in-memory data between the host device and an internal memory of the non-volatile storage, and
execute host-side acceleration operations, on the hardware accelerator, based on maintained representation of filesystem information,
wherein the internal memory is configured to store a representation of a filesystem, wherein the internal memory is periodically synchronized with a memory of the host device, and wherein the representation of the filesystem stored in the internal memory is updated according to the memory of the host device.

2. The system of claim 1,
wherein the filesystem reader is configured to read the retrieved data to the host device by:
receiving a file path from the host device,
locating file data on the non-volatile storage for the host device corresponding to received file path, and
reading blocks corresponding to located file data into the internal memory,
wherein the hardware accelerator is configured to further execute an acceleration operation.

3. The system of claim 1, wherein
the hardware accelerator is configured to:
receive a scan operation from the host device;
scan filesystem metadata from the non-volatile storage; and
render the representation of the filesystem on the internal memory.

4. The system of claim 3, wherein the hardware accelerator includes any one of field programmable gate arrays (FPGA), application specific integrated circuits (ASIC), or firmware to manage the non-volatile storage.

5. The system of claim 1, wherein the system is implemented at a data center.

6. A hardware accelerator having executable components thereon, the components comprising:
  a filesystem reader configured to:
    scan filesystem metadata of a non-volatile storage device, and
    render an in-memory representation of a filesystem on an internal memory of the non-volatile storage device; and
  an accelerator engine configured to:
    synchronize in-memory data between a host device and the internal memory, and
    execute acceleration operations based on the in-memory representation of the filesystem,
  wherein, in response to a command from the host device, the filesystem reader is configured to further:
    synchronize the in-memory representation of the filesystem on the internal memory and an in-memory representation of the filesystem on a memory of the host device, and
    update the in-memory representation of the filesystem on the internal memory.

7. The hardware accelerator of claim 6, wherein the hardware accelerator further comprises a processor that includes any one of field programmable gate arrays (FPGA), application specific integrated circuits (ASIC), or firmware.

8. The hardware accelerator of claim 7, wherein the filesystem reader is configured to scan the filesystem metadata of the non-volatile storage device in response to the command from the host device.

9. A method of accelerating hardware performance for a host device relative to a non-volatile storage device, the method comprising:

storing on-disk data on the non-volatile storage device;

maintaining a representation of filesystem information corresponding to the non-volatile storage device on an offloading engine that is intermediate to the host device and the non-volatile storage device;

retrieving data, by the offloading engine, requested by the host device;

reading, by the offloading engine, retrieved data to the host device;

synchronizing, by the offloading engine, in-memory data between the host device and an internal memory of the offloading engine; and executing, by the offloading engine, host-side operations based on the representation of filesystem information, wherein synchronizing, by the offloading engine, the in-memory data between the host device and the internal memory comprises:
  periodically synchronizing the offloading engine with a memory of the host device; and
  updating the representation of the filesystem information stored in the internal memory according to the memory of the host device.

10. The method of claim 9, wherein the offloading engine reads the retrieved data to the host device by:
  receiving a file path from the host device,
  locating file data on the non-volatile storage device for the host device corresponding to received file path, and
  reading blocks corresponding to located file data into the internal memory of the offloading engine.

11. The method of claim 9, wherein the offloading engine includes any one of field programmable gate arrays (FPGA), application specific integrated circuits (ASIC), or firmware.

* * * * *